United States Patent [19]

Downs et al.

[11] Patent Number: 5,588,327
[45] Date of Patent: Dec. 31, 1996

[54] MULTIPLEXED HYDRAULIC CLUTCH CONTROL

[75] Inventors: Robert C. Downs, Clarkston; James K. Mainquist, Troy; Larry T. Nitz, Rochester; William L. Aldrich, III, Davisburg, all of Mich.

[73] Assignee: Saturn Corporation, Troy, Mich.

[21] Appl. No.: 533,571

[22] Filed: Sep. 25, 1995

[51] Int. Cl.⁶ ................................... F16H 61/08
[52] U.S. Cl. .................... 74/335; 192/87.13; 477/155
[58] Field of Search .................... 74/335, 336; 477/67, 477/68, 154, 155; 192/87.13, 87.18, 87.19, 3.58

[56] References Cited

U.S. PATENT DOCUMENTS

| | | |
|---|---|---|
| 4,283,970 | 8/1981 | Vukovich . |
| 4,342,545 | 8/1982 | Schuster ..................................... 418/26 |
| 4,756,213 | 7/1988 | Mainquist et al. ..................... 74/335 X |
| 5,462,501 | 10/1995 | Bullmer et al. ........................... 477/155 |
| 5,481,932 | 1/1996 | Downs et al. ............................. 74/331 |
| 5,508,916 | 4/1996 | Markyvech et al. .................... 477/68 X |

Primary Examiner—Rodney H. Bonck
Attorney, Agent, or Firm—Vincent A. Cichosz

[57] ABSTRACT

A five-speed parallel-shaft clutch-to-clutch shifting automatic transmission has an hydraulically responsive clutch priority valve effective to exhaust fluid pressure from lower priority clutches upon undesirable simultaneous application two or more clutches. Two clutches associated with numerically nonadjacent gear ratios are supplied fluid pressure from a single solenoid controlled fluid valve vis-a-vis a two mutually exclusive state multiplex valve. The clutch priority valve is interposed between the solenoid controlled fluid valve and the multi-plex valve thereby rendering the two clutch states associated with the single solenoid valve indistinguishable by the clutch priority valve. A fluid pressure control provides for a clutch priority valve override to prevent undesirable exhausting of the desired clutch supplied via the multi-plexed solenoid controlled fluid valve which otherwise may occur upon shifting to one of the two gear ratios corresponding to one of the two clutches supplied by the multi-plexed valve.

5 Claims, 8 Drawing Sheets

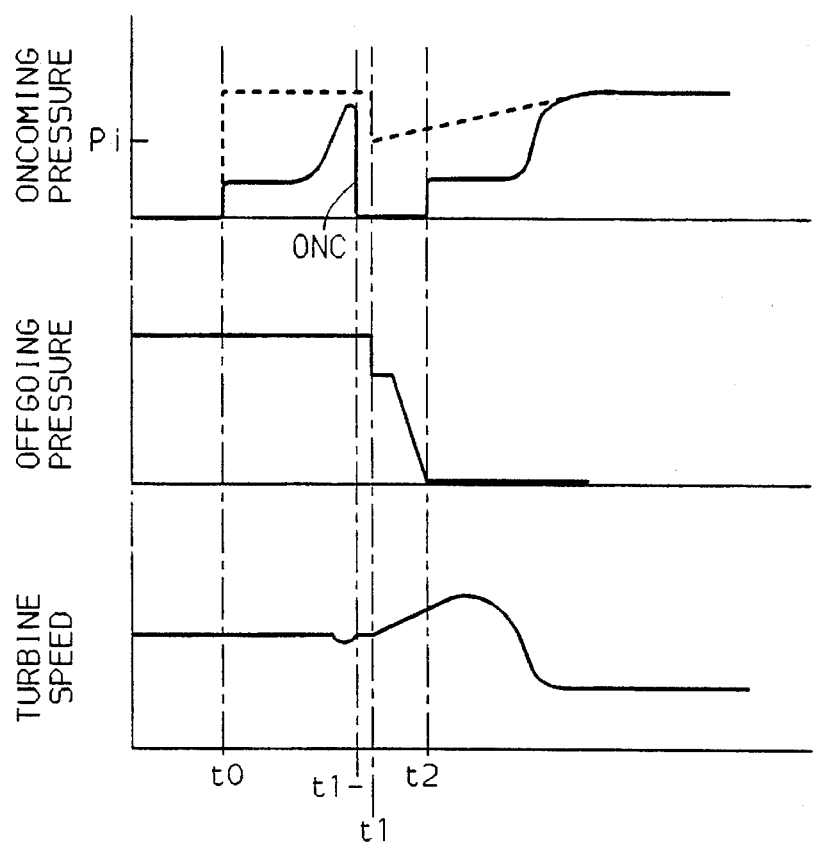

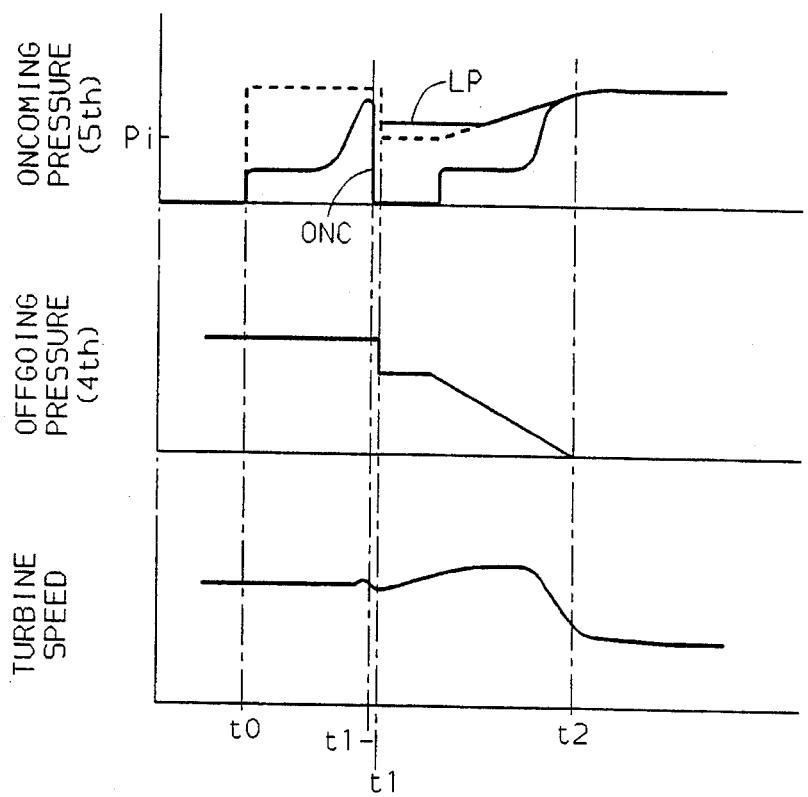
FIG. 10A
FIG. 10B
FIG. 10C
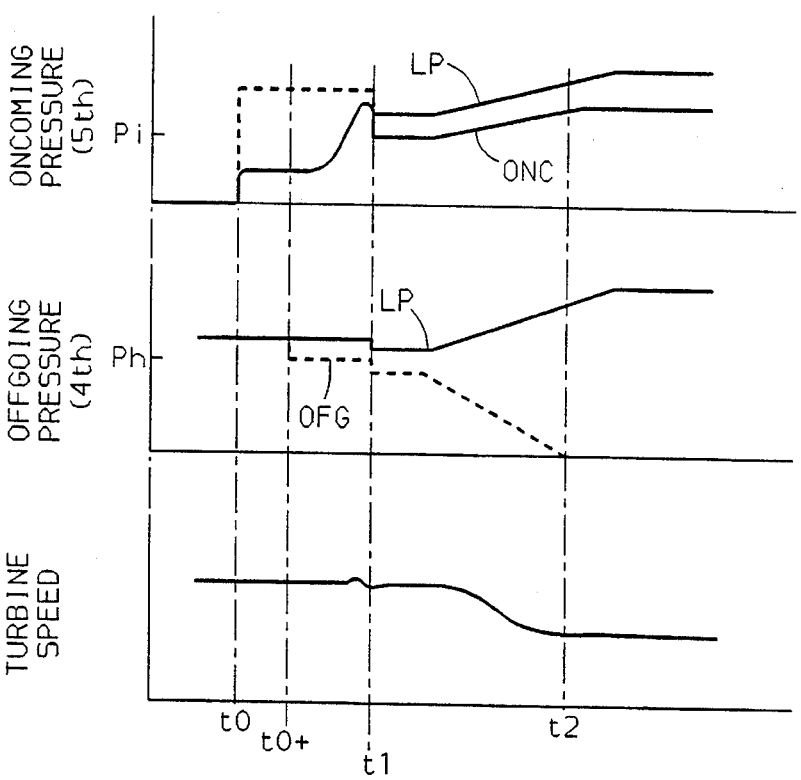
FIG. 11A
FIG. 11B
FIG. 11C

MULTIPLEXED HYDRAULIC CLUTCH CONTROL

This invention relates to shift control in a multi-speed ratio clutch-to-clutch automatic shift transmission, and more particularly, to a control which provides override of inappropriate hydraulic clutch selection in a clutch control having a multiplexed fluid valve arrangement.

BACKGROUND OF THE INVENTION

Motor vehicle transmissions of the type addressed by this invention include several fluid operated torque transmitting devices, referred to herein as clutches, which are automatically engaged and disengaged according to a predefined pattern to establish different speed ratios between input and output shafts of the transmission. The input shaft is coupled to an internal combustion engine through a fluid coupling such as a torque converter, and the output shaft is mechanically connected to drive one or more vehicle wheels.

The various speed ratios of the transmission are typically defined in terms of the ratio Ni/No, where Ni is the input shaft speed and No is the output shaft speed. Speed ratios having a relatively high numerical value provide a relatively low output speed and are generally referred to as lower speed ratios; speed ratios having a relatively low numerical value provide a relatively high output speed and are generally referred to as upper speed ratios.

Shifting between the various speed ratios generally involves disengaging a clutch associated with the current or actual speed ratio Ract by controlling clutch fluid pressure with a first fluid valve, and engaging a clutch associated with the desired speed ratio Rdes by controlling clutch fluid pressure with a second fluid valve. The clutch to be released is referred to as the off-going clutch, while the clutch to be engaged is referred to as the on-coming clutch. Shifts of this type are referred to as clutch-to-clutch in that no speed responsive or freewheeling elements are used.

Conventional clutch-to-clutch controls are mechanized such that each of such clutches has associated therewith a dedicated fluid valve. Mechanizations are known utilizing a fluid operated clutch priority valve responsive to fluid pressures of the various fluid valves to prevent transmission tie ups caused by clutches having undesirable simultaneous capacity. The present invention is directed toward an override control of a clutch priority valve in a clutch-to-clutch control having a single fluid valve controlling two gear ratio clutches and a clutch priority valve mechanized such that the fluid pressures associated with the two gear ratio clutches controlled by the single fluid valve are indistinguishable thereby.

SUMMARY OF THE PRESENT INVENTION

The present invention is directed to a control for overriding a hydraulic priority during a clutch-to-clutch shift in an automatic transmission. The transmission has a plurality of gear ratios and a corresponding plurality of controllably engagable fluid operated friction devices (clutches). Each clutch receives fluid pressure from a solenoid controlled fluid supply valve. A single solenoid operated fluid supply valve (dual supply valve) supplies fluid pressure to one of two non-numerically adjacent friction devices in conjunction with a multiplexing valve for selectively directing the fluid flow to the desired one of the two friction devices. Interposed between the fluid valve and the multiplex valve is a hydraulic priority valve which operates in response to a net fluid supply valve pressure bias to selectively exhaust fluid pressure from all but the one clutch having the highest predetermined priority when there exists a condition of one clutch having substantial overlap in fluid pressure with that of another clutch. The clutch priority valve, being interposed between the dual supply valve and the multiplex valve does not distinguish which of the two multiplexed clutches is receiving the corresponding fluid pressure. But for the multiplex arrangement, the priority valve normally operates progressively through the various gear ratios; that is to say the priority is established monotonically with respect to one of the upward or downward directions of gear progression.

The present invention operates to override the clutch priority valve's normal hydraulic operation during certain shifts. Those shifts correspond to shifts which occur from an off-going clutch to the one of the two multiplexed clutches in the gear progression direction of normal priority but for the multiplexing which, absent the override of the present invention, will cause the undesirable exhausting of the on-coming clutch in the event of substantial fluid pressure overlap between the on-coming and off-going fluid pressures. Such shifts are referred to herein as override shifts.

In accordance with one preferred aspect of the present invention, during the fill phase of an override shift of the on-coming clutch, the off-going clutch pressure is reduced to a value that maintains engagement of the off-going clutch and that ensures that the net fluid pressure bias at the clutch priority valve does not cause the clutch priority valve to undesirably exhaust the on-coming clutch.

In accordance with another preferred aspect of the present invention, line pressure comprises a bias pressure at the clutch priority valve operative in opposition to an additive contribution of the off-going and on-coming fluid pressure biases.

In accordance with yet preferred another aspect of the present invention, the off-going fluid pressure reduction is implemented at a predetermined time from the end of the fill period of the on-coming clutch.

In accordance with still another preferred aspect of the present invention, the off-going fluid pressure reduction is implemented at a predetermined progression ratio through the fill phase of the oncoming clutch.

BRIEF DESCRIPTION OF THE DRAWINGS

FIG. 3 illustrates various clutch control signals, clutch pressures and turbine speed responses during a precise timed (hot) shift absent the control of the present invention.

FIGS. 4A, 4B, and 4C illustrate various clutch control signals, clutch pressures and turbine speed responses during a precise timed shift without the control of the present invention.

FIGS. 10A, 10B and 10C illustrate various clutch control signals, clutch pressures and turbine speed responses during a sequenced (cold) shift absent the control of the present invention.

FIGS. 11A, 11B, and 11C illustrate various clutch control signals, clutch pressures and turbine speed responses during a sequenced shift without the control of the present invention.

DETAILED DESCRIPTION OF THE DRAWINGS

Figure 1:
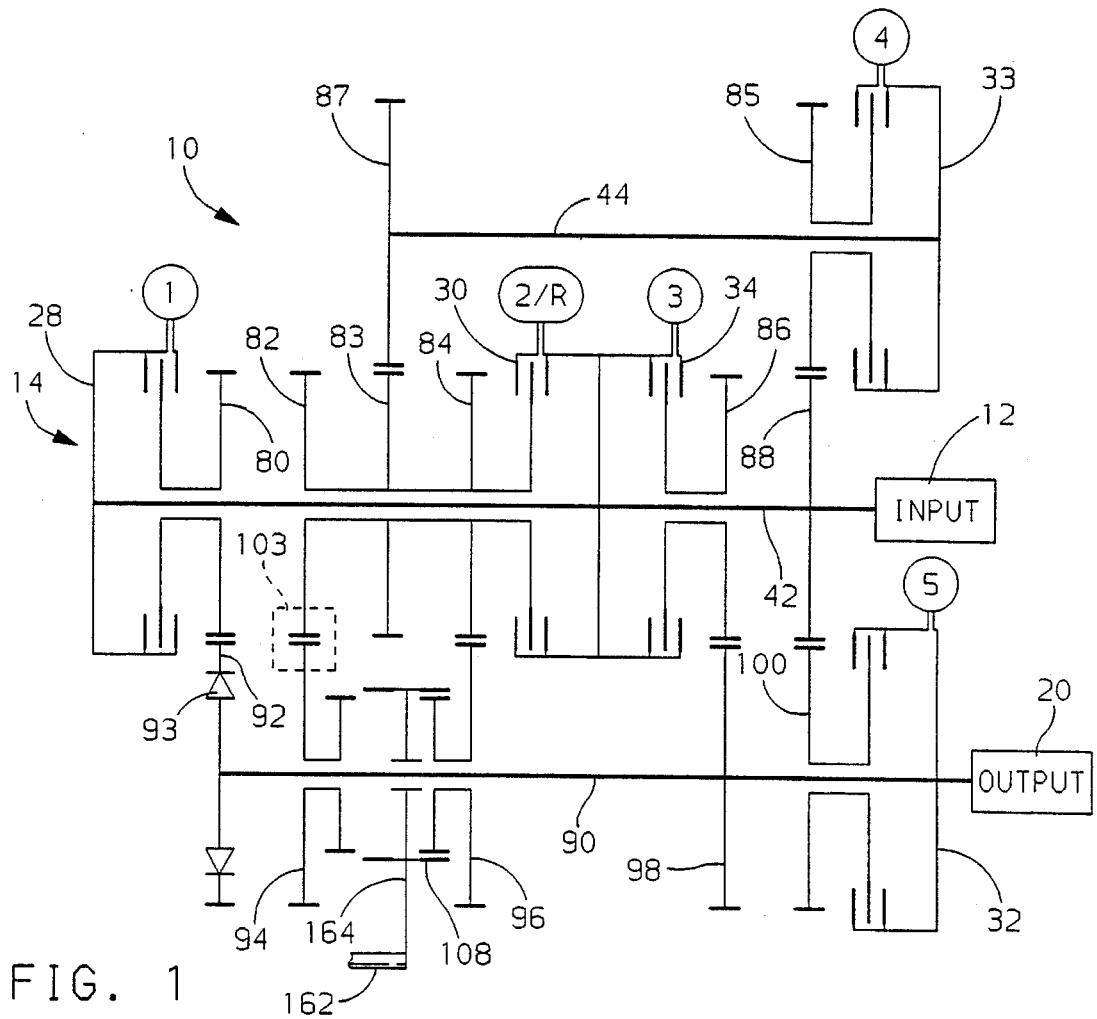
FIGS. 1–2 schematically depict a computer-based electronic transmission control system in accordance with the present invention.

Referring particularly to FIGS. 1a and 1b, the reference numeral 10 generally designates a motor vehicle drivetrain including a parallel shaft transmission 14 having a reverse speed ratio and five forward speed ratios. Input 12 includes an engine fueled by a conventional method to produce output torque. Such torque is applied to the transmission 14 through an engine output shaft and torque converter. The transmission 14, in turn, transmits engine output torque to a pair of drive axles through one or more of the fluid operated clutches 28–34, such clutches being applied or released according to a predetermined schedule for establishing the desired transmission speed ratio.

Regulated pressurized fluid (hereinafter referred to as line pressure) is supplied by a conventional engine driven fluid pump and solenoid controlled pressure regulator valve (not shown) to the transmission control elements via line 66. While the fluid pump and pressure regulator valve designs are not critical to the invention, exemplary fluid pump and pressure regulator valve designs for providing line pressure are disclosed in Schuster U.S. Pat. No. 4,342,545 issued Aug. 3, 1982 and Vukovich U.S. Pat. No. 4,283,970, issued Aug. 18, 1981, respectively.

An exemplary parallel shaft five speed transmission is disclosed in co-pending U.S. patent application Ser. No. 08/219,311, also assigned to the assignee of the present invention. The transmission input shaft 42 and transmission output shaft 90 each have a plurality of gear elements rotatably supported thereon. Transfer shaft 44 has gear element 85 rotatably supported thereon and gear element 87 rigidly connected thereto. The gear elements 80–88 are supported on shaft 42 and the gear elements 92–100 are supported on shaft 90. The gear element 88 is rigidly connected to the shaft 42, and the gear element 98 is rigidly connected to the shaft 90. Gear element 92 is connected to the shaft 90 via a freewheeler or one-way device 93. The gear elements 80,83,84,86 and 88 are maintained in meshing engagement with the gear elements 92,87,96,98 and 100, respectively, and the gear element 82 is coupled to the gear element 94 through a reverse idler gear 103. The shaft 90, in ram, is coupled to the output 20 including conventional final drive gears, a differential gear set and drive axles (not shown).

A dog clutch 108 is splined on the shaft 90 so as to be axially slidable hereon, and serves to rigidly connect the shaft 90 either to the gear element 96 (as shown) or the gear element 94. A forward speed relation between the gear element 84 and shaft 90 is established when dog clutch 108 connects the shaft 90 to gear element 96, and a reverse speed relation between the gear element 82 and shaft 90 is established when the dog clutch 108 connects the shaft 90 to the gear element 94.

The clutches 28–34 each comprise an input member rigidly connected to a transmission shaft 42,44 or 90, and an output member rigidly connected to one or more gear elements such that engagement of a clutch couples the respective gear element and shaft to effect a driving connection between the shafts 42,44 and 90. The clutch 28 couples the shaft 42 to the gear element 80; the clutch 30 couples the shaft 42 to the gear elements 82,83 and 84; the clutch 32 couples the shaft 90 to the gear element 100; the clutch 34 couples the shaft 42 to the gear element 86, and the clutch 33 couples the shaft 44 to the gear element 85. Each of the clutches 28–34 is biased toward a disengaged state by a rerun spring (not shown). Engagement of the clutch is effected by supplying fluid pressure to an apply chamber thereof. The resulting torque capacity of the clutch is a function of the applied pressure less the return spring pressure, hereinafter referred to as the working pressure. The circled numeral 1 represents a fluid passage for supplying pressurized fluid to the apply chamber of clutch 28; the circled numeral 2 and letter R represent a fluid passage for supplying pressurized fluid to the apply chamber of the clutch 30; the circled numeral 3 represents a fluid passage for supplying pressurized fluid to the apply chamber of the clutch 34; the circled numeral 4 represents a fluid passage for directing pressurized fluid to the apply chamber of the clutch 33; and the circled numeral 5 represents a fluid passage for directing pressurized fluid to the apply chamber of clutch 34.

The various gear elements 80–88 and 92–100 are relatively sized such that engagement of first, second, third, fourth and fifth forward speed ratios are effected by engaging the clutches 28,30,34,33 and 32, respectively, it being understood that the dog clutch 108 must be in the position depicted in FIG. 1 to obtain a forward speed ratio. A neutral speed ratio or an effective disconnection of the output 20 from the input 12 is effected by maintaining all of the clutches 28–34 in a released condition. The speed ratios defined by the various cooperative gear elements are generally characterized by the ratio of the turbine speed Nt to output speed No.

Clutch-to-clutch shifting from a current speed ratio to a desired speed ratio requires the disengagement of an off-going clutch associated with the current speed ratio and the engagement of an on-coming clutch associated with the desired speed ratio. For example, a downshift from the Fourth speed ratio to the Third speed ratio involves disengagement of the clutch 33 and engagement of the clutch 34. An upshift from the Fourth speed ratio to the Fifth speed ratio involves disengagement of the clutch 33 and engagement of clutch 32.

The fluid control elements for effecting engagement and disengagement of the clutches 28–34 include a manual valve 140, a directional servo 160 and a servo apply valve 167, a plurality of electrically operated fluid valves 182–187, a mode select valve 205 and clutch priority valve 201. The manual valve 140 operates in response to operator demand and serves, in conjunction with directional servo 160 and servo apply valve 167, to direct regulated line pressure to the appropriate fluid valves 182–187. The fluid valves 182–187, in turn, are individually controlled to direct fluid pressure to the clutches 30–34, in conjunction with clutch priority valve 201 and mode select valve 205. The directional servo 160 operates in response to the condition of the manual valve 140 and servo apply valve 167, and serves to properly position the dog clutch 108.

The manual valve 140 includes a shaft 142 for receiving axial mechanical input from the operator of the motor vehicle in relation to the speed range the operator desires. The shaft 142 is also connected to an indicator mechanism 144 through a suitable mechanical linkage as indicated generally by the broken line 146. Fluid pressure from line 66 is applied as an input to the manual valve 140 and the valve outputs include forward (F) output lines 150,178F for supplying fluid pressure for engaging forward speed ratios and a reverse (R) output line 165 for supplying fluid pressure for engaging the reverse speed ratio. Thus, when the shaft 142 of manual valve 140 is moved to the D4, D3, or D2 positions shown on the indicator mechanism 144, line pressure from the line 66 is directed to the forward (F) output lines 150, 178F. When the shaft 142 is in the R position shown on the indicator mechanism 144, line pressure from the line 66 is directed to the reverse (R) output line 165 and forward line 150 is connected to exhaust line 154 which is adapted to return any fluid therein to the fluid reservoir (not shown). When the shaft 142 of manual valve 140 is in the N (neutral) of P (park) positions, the input line 66 is isolated, and the forward and reverse output lines 150, 178F and 165 are connected to exhaust line 154.

The directional servo 160 is a fluid operated device and includes an output shaft 162 connected to a shift fork 164 for axially shifting the dog clutch 108 on shaft 90 to selectively enable either forward or reverse speed ratios. The output shaft 162 is connected to a piston 166 axially movable within the servo housing 168. The axial position of the piston 166 within the housing 168 is determined according to the fluid pressures supplied to the chambers 170 and 172. The forward output line 150 of manual valve 140 is connected to the chamber 170 and the reverse output line 165 of manual valve 140 is selectively connected via servo apply valve 167 and the line 169 to the chamber 172. When the shaft 142 of the manual valve 140 is in a forward range position, the fluid pressure in the chamber 170 urges piston 166 rightward as viewed in FIG. 1 to engage the dog clutch 108 with the gear element 96 for enabling engagement of a forward speed ratio. Fluid pressure in line 150 biases servo apply valve 167 to isolate line 169 and exhaust line 165. When the shaft 142 of the manual valve 140 is moved to the R position, the fluid pressure in line 165 biases valve 167 to supply line 169 with fluid pressure. Fluid pressure in chamber 172 urges piston 166 leftward as viewed in FIG. 1 to engage the dog clutch 108 with the gear element 94 for enabling engagement of the reverse speed ratio. In each case, it will be remembered that the actual engagement of the forward or reverse speed ratio is not effected until engagement of the appropriate clutch.

The directional servo 160 also operates as a fluid valve for enabling the reverse speed ratio. To this end, the directional servo 160 includes an output line 178R connected to the electrically operated dual supply valve 186 (dual supply valve). When the operator selects a forward speed ratio and the piston 166 of directional servo 160 is in the position depicted in FIG. 1, the passage 173 between lines 169 and 178R is cut off; when the operator selects the reverse gear ratio, the passage 173 between the lines 176 and 178R is open.

The electrically operated fluid valves 182–186 each receive fluid pressure at an input passage thereof and are individually controlled to direct fluid pressure to respective clutches 30–34 via clutch priority valve 201 and in the case of dual supply valve 186, also via mode select valve 205. Clutch priority valve 201 receives line pressure directly from input line 66, and is hydraulically responsive to the various fluid pressures of valves 182–186 working in opposition to the line pressure and a spring bias. The clutch priority valve 201 is calibrated such that the various combinations of two or more simultaneously supplied valve (182–186) pressures cause exhausting of the associated lower ranked clutch(es) while maintaining the supply of fluid pressure to the highest ranked clutch. The preferred priority rank of clutches, high to low, is highest gear to lowest gear, although priority may alternately be configured from lowest to highest gear if desired. An exemplary clutch priority valve can be found in U.S. Pat. No. 4,756,213 to Mainquist et al., assigned to the assignee of the present invention and operates in response to a net bias pressure comprising bias pressures from all fluid supply valves and line pressure. The precise design is not critical to the present invention and therefore is not detailed herein. It is noted also that alternative designs for hydraulic priority valves, including those responsive only to bias pressures supplied by fluid supply valves to the exclusion of line pressure, are equally applicable to the control of the present invention. It is preferred, however, that a clutch priority valve having a line pressure bias be utilized for reasons of desensitizing the valve during the override thereof as will become more apparent in the description corresponding to the flow charts to follow.

The electrically operated fluid valve 187 receives fluid pressure at an input passage thereof and is controlled to direct fluid pressure to mode select valve 205 via line 204. Mode select valve will assume a spring biased state (as illustrated) coupling fluid pressure from line 203 to clutch 30 or a fluid biased state coupling the fluid pressure form line 203 to clutch 32. In the present embodiment of the invention, dual supply valve 186 is coupled to the lowest priority port, valve 184 to the next priority port and valve 182 to the highest priority port of clutch priority valve 201. Therefore, in the case of simultaneously supplied fluid pressures from dual supply valve 186 and one of valves 184 and 182, the clutch 30 or 32 coupled to line 203 through mode select valve 205 will be exhausted and the clutch 34 or 33 will be coupled to the respective valve 184,182.

Each of the fluid valves 182–187 is a three port electrically activated valve. Each of the fluid valves 182–186 includes an inlet port (illustrated on the side), an outlet port (illustrated at the top), and an exhaust port (illustrated at the bottom) and indicated by the circled letters EX. When a respective valve is energized (ON), the inlet port is isolated and the outlet port is connected to the exhaust port to drain fluid from the respective clutch or the mode select valve in the instance of fluid valve 187. When a respective valve is de-energized (OFF), the inlet port is connected to the outlet port to supply fluid pressure to the respective clutch or the mode select valve in the instance of fluid valve 187 and the exhaust port is isolated. As set forth hereinafter, the control unit 270 pulse-width-modulates the respective valves 182–187 according to a predetermined control algorithm to regulate the fluid pressure supplied to the clutches 30–34 or mode select valve in the instance of fluid valve 187, the duty cycle of such modulation being determined in relation to the desired magnitude of the supplied pressures.

Input signals for the control unit 270 are provided on the input lines 272–284. A position sensor (S) 286 responsive to movement of the manual valve shaft 142 provides an input signal to the control unit 270 via line 272. Speed transducers (not shown) sense the rotational velocity of various rotary members within the transmission 14 and supply speed signals in accordance therewith to the control unit 270 via lines 274,276 and 278. The velocity of the transmission shaft 42 and therefore the turbine or transmission input speed Nt is input by line 274. The velocity of the drive axle (not shown) and therefore the transmission output speed No is input by line 276; and the velocity of the engine output shaft (not shown) and therefore the engine speed Ne is input by line 278. The throttle position of the engine provides an electrical signal in accordance therewith to control unit 270 via line 280. A pressure transducer (not shown) senses the manifold absolute pressure (MAP) of the engine and provides an electrical signal to the control unit 270 in accordance therewith via line 282. A temperature sensor (not shown) senses the temperature of the transmission fluid and provides an electrical signal in accordance therewith to control unit 270 via line 284.

The control unit 270 responds to the input signals on input lines 272–284 according to a predetermined control algorithm as set forth herein, for controlling the operation of fluid valves 182–187 via output lines 260–265. As such, the control unit 270 includes an input/output (I/O) device for receiving the input signals and outputting the various control signals, and a microcomputer which communicates with the I/O device via an address-and-control bus and a bidirectional data bus.

The fluid valves 182,184,187 receive fluid pressure from the forward output line 150 of manual valve 140. Fluid valves 182,184 are controlled to direct variable amounts of such pressure through clutch priority valve 210 to the clutches 34 and 33 as indicated by the circled numerals 3 and 4, respectively. Fluid valve 187 is controlled to direct such pressure to mode select valve 205 through line 204. Dual supply valve 186 receives fluid pressure from the line 178 via one of lines 178F or 178R and is controlled to direct a variable amount of such pressure to the mode select valve 205 via line 203. Mode select valve 205 routes pressure from line 203 to one of the clutches 30 and 32 as indicated by the circled numerals 2/R and 5, respectively. Additionally, the one of clutches 30 and 32 not connected to pressure from line 203 is exhausted through the mode select valve in the passage marked with circled letters EX. When mode valve 187 is energized, line pressure from 150 is blocked, line 204 is exhausted and mode select valve is spring biased into a position—left in the figure—which connects clutch 30 (second and reverse speed ratios) to fluid pressure from line 203. When mode valve 187 is de-energized, line pressure from 150 is supplied via line 204 to shift mode select valve 205 against the spring bias into a position which connects clutch 32 (fifth speed ratio) to fluid pressure from line 203. It can be appreciated, therefore, that a hydraulic back-up for a condition of loss of electrical solenoid valve control of the mode valve 187 would result in connection of line 150 to line 204. If the manual valve is in a forward speed range, line 150 is at line pressure and mode select valve connects line 203 to clutch 32 and exhausts clutch 30. However, if the manual valve is in reverse, line 150 is exhausted by the manual valve and the mode select valve is spring biased into a position to connect line 203 with clutch 30 thereby allowing reverse gear actuation in hydraulic back-up and preventing fifth gear operation when reverse is selected.

Since the fluid pressure controlled by dual supply valve 186 supplies both clutch 30 for actuation of the second speed ratio and clutch 32 for actuation of the fifth speed ratio through the lowest priority port of the clutch priority valve 201, second and fifth gear hydraulic states are identical at the lowest priority port of the clutch priority valve 201. The second and fifth speed ratio hydraulic states are differentiated at the mode select valve whereat the fluid pressure form line 203 is routed to the appropriate clutch. The clutch priority valve in combination with a fluid valve for supplying fluid pressure to a clutch have preferentially been arranged in this embodiment to supply the clutches associated with two non-adjacent gear ratios and, in fact, the two most extreme fluid valve controlled clutch-to-clutch shifted gear ratios. In accord with the controls for torque transfer between on-coming and off-going clutches, supplying adjacent gear ratios fluid pressure from single fluid valve is not possible. Nonadjacent gear ratios are selected in order that all single ratio shifts remain available. Since certain shifts between gear ratios sharing a single fluid valve are not possible, it is desirable that the least often executed of such shifts establish which gear ratios will share the common fluid valve. Since the present embodiment relies on fluid valve controlled clutch-to-clutch shifting between gear ratios 2 through 5—first gear clutch being responsive to manual valve forward range selection via line 150 and fluid pressure reducer 151 and one-way coupled to the output—clutches 30 and 32 associated therewith are the preferred clutches sharing a common fluid supply valve. Of course, if clutch-to-clutch shifting were employed in conjunction with the first speed ratio, the clutch associated with first gear and any other non-adjacent fluid valve controlled speed ratio would be an equally acceptable pair of speed ratios for implementation of a similar common fluid valve arrangement.

A clutch-to-clutch shift involves the disengagement of an off-going clutch and the engagement of an on-coming clutch. Each shift includes a fill phase during which the apply chamber of the on-coming clutch is filled with fluid, a torque phase during which the torque capacity of the off-going clutch is reduced and the torque capacity of the on-coming clutch is increased, and an inertia phase during which the turbine is accelerated to a new velocity determined according to the new speed ratio. During the early part (fill phase) of an upshift, a condition of impending tie-up between the two subject gear ratios will result in the clutch priority valve exhausting the lower priority (lower gear ratio) clutch while the on-coming gear clutch capacity is increased in accordance with the shift schedule to complete the shift. This feature, as mentioned, is a hydraulic function of the clutch priority valve 201. However, since the clutch priority valve does not distinguish between the hydraulic states of second gear and fifth gear in the present configuration, a fourth (or third) gear to fifth gear shift may result in the clutch priority valve exhausting the desired on-coming fifth gear clutch since hydraulically it appears to the clutch priority valve as the lower priority clutch. The off-going fourth gear clutch capacity, however, continues in accordance with the shift schedule to be reduced, thereby creating an undesirable neutral condition. Such a condition is illustrated with respect to FIG. 3.

Graph A of FIG. 3 is generally illustrative of the on-coming (fifth gear) clutch pressure command (broken line) and actual on-coming clutch pressure (ONC) (solid line). Graph B is generally illustrative of the off-going (fourth gear) clutch pressure. Graph C is generally illustrative of the turbine speed, or transmission input speed. All graphs A–C are illustrated along a common time axis. The fourth gear to fifth gear upshift is characterized by a fill period t0-t1 during which dual supply valve 186 is energized at a duty cycle of 0% to commence filling of clutch 32, the mode select valve 205 having already been biased to connect line 203 of the clutch priority valve to the fifth clutch port thereof. Also during the fill phase t0-t1, off-going pressure to the fourth gear clutch is maintained at substantially line pressure to maintain engagement of the fourth gear ratio as shown in graph B. Actual pressure in the apply chamber of clutch 32 begins to rise after it has been filled and begins to achieve torque capacity as evidenced in graph C by the small turbine speed decrease appearing just prior to time t1–. Such pressure rise in the on-coming clutch and associated torque capacity concurrent with the high off-going clutch pressure and capacity results in the exhausting of the lower priority clutch (fifth gear) at time t1– as illustrated by the almost instantaneous reduction in on-coming pressure in graph A. The off-going clutch pressure continues to follow the pre-determined shift schedule by progressively decreasing from time t1 to time t2 as seen in graph B. The illustrated step down in off-going pressure just after time t1 merely marks a pressure matching duration in which the phasing of the PWM duty cycles of the fluid valve supplying the off-going clutch and the pressure regulator valve are matched as well known and practiced in the art. It can therefore be appreciated that during the decrease in the off-going pressure while the clutch priority valve maintains the exhausting of clutch 32, the transmission progressively decouples from the input and operates in a neutral state. The resulting turbine speed therefore is seen to flare. At time t2 where off-going pressure has reduced to substantially zero, clutch priority valve 201 has re-established a normal position such that the exhausting of clutch 32 terminates. Dual supply valve 186, still responding to the on-coming clutch pressure command (broken line), re-fills clutch 32 apply chamber from time t2. As torque capacity of clutch 32 is reestablished, the turbine speed flare is quelled as turbine speed is pulled-down.

The present invention provides a controlled override of the clutch priority valve to prevent the exhausting of the fifth clutch in a X-5 upshift where X represents the off-going clutch element associated with the lower gear ratio from which an upshift to the fifth gear ratio vis-a-vis the on-coming fifth gear ratio clutch is being made. In the present embodiment wherein the first gear ratio releases from a freewheel device and the second gear ratio is the one of the remaining clutch controlled gear ratios having fluid supplied thereto from a fluid valve also supplying fluid to the fifth gear ratio, X may represent either one of gear ratios 3 or 4. A 2–5 upshift is precluded by virtue of the inability of a single fluid valve to simultaneously supply fluid to one clutch (5th) and exhaust fluid from another (2nd).

Referring to FIG. 4, graphs A–C illustrate exemplary on-coming, off-going and turbine speed quantities as responsive to the control of the present invention. On-coming pressure is again shown commanded at 0% duty cycle during a fill phase t0-t1 and actual on-coming clutch pressure is seen to increase toward the commanded pressure after the clutch chamber has been filled. To alleviate the hydraulic priority selection of the still applied fourth speed ratio clutch 33 by the clutch priority valve 201, off-going clutch pressure (OFG) (broken line) is relaxed at time t0+ as shown in graph B from substantially line pressure (solid trace) to a predetermined hold pressure (Ph). Hold pressure Ph is still sufficient to maintain the torque capacity of the off-going clutch; however, it is insufficient in conjunction with the on-coming pressure to shift the clutch priority valve 201 against the line pressure as previously describe. Therefore, the fifth clutch does not undergo an exhaust of the fluid in the clutch chamber by manipulating a pressure presented to the clutch priority valve 201. The actual oncoming pressure (solid line) is seen to drop at the end of the fill period t1 to a predetermined initial value Pi in accordance with the commanded pressure (broken line) as shown in graph A. The illustrated step down in line pressure just after time t1 again merely marks a pressure matching duration in which the phasing of the PWM duty cycles of the fluid valve supplying the off-going clutch and the pressure regulator valve are matched. The torque phase of the shift is now entered at time t1 as the on-coming pressure increases and the off-going pressure decreases to thereby effectuate torque transfer from the fourth gear ratio to the fifth gear ratio as evidenced by the pulldown in turbine speed (graph C).

The above described events are generally carded out to effectuate a precise timed shift with a goal of minimal duration. Such shifts are generally accomplished during periods of vehicle operation wherein the transmission working fluid has surpassed a predetermined temperature threshold. Essentially, the vehicle has "warmed up" and the working fluid can be precisely and predictably controlled thereby lending itself to precision shift timing control. However, it is well known that prior to warming up, the transmission working fluid characteristics are such that it is desirable to implement certain shift controls over an extended period to alleviate for the somewhat more unpredictable and inherent imprecision thereof. Therefore, it is known to implement upshift control in what is termed a sequenced shift. Such a sequenced shift is illustrated herein for the sake of completeness and as an alternative embodiment of the control of the present invention as will become more apparent in the discussion of the flow charts of FIGS. 5–9 at a later point.

Turning now to the various graphs of FIGS. 10 and 11, a sequenced 4–5 upshift is illustrated without the benefit of the present control and with the benefit of the present control, respectively. The time designations t0, t0+, t1–, t1 and t2 again correspond to certain events during the shift progression. Graph A of FIG. 10 illustrates the on-coming clutch pressure command as a broken trace, and the actual on-coming clutch pressure (ONC) and line pressure (LP) as solid traces. Graph B illustrates the off-going clutch pressure and the line pressure as solid traces. As with a precise timed shift, during the fill period of the on-coming clutch (t0-t1) actual clutch pressure is seen to rise to the point where the priority valve is biased to exhaust the on-coming clutch thereby eliminating its torque capacity. Also during the fill phase t0-t1, off-going pressure to the fourth gear clutch is maintained at substantially line pressure to maintain engagement of the fourth gear ratio as shown in graph B. The off-going clutch pressure continues to follow the predetermined shift schedule by progressively decreasing from time t1 to time t2 as seen in graph B. The illustrated step down in off-going pressure just after time t1 merely marks the pressure matching duration. The oncoming clutch commanded pressure (ONC) is shown to be modulated to lesser than the line pressure (LP) just after the fill period terminates to thereby bring the on-coming clutch on over an extended period of time relative to a precise timed shift. Likewise, the off-going pressure (OFG) in graph B is seen to reduce at a lesser rate for the same purpose of extending the torque transfer. While the shift controls are somewhat different in the sequenced shift, the priority valve is still operational as previously described and it can therefore be appreciated that during the decrease in the off-going pressure while the clutch priority valve maintains the exhausting of the on-coming clutch, the transmission progressively decouples from the input and operates in a neutral state. The resulting turbine speed therefore is seen to flare in graph C. After time t2, the control recovers in much the same way as the precise timed shift.

The present invention as implemented within respect to a sequenced shift also provides a controlled override of the clutch priority valve to prevent the exhausting of the fifth clutch. Referring to FIG. 11, graphs A–C illustrate exemplary on-coming, off-going and turbine speed quantities as responsive to the control of the present invention. On-coming pressure is again shown commanded at 0% duty cycle during a fill phase t0-t1 and actual on-coming clutch pressure is seen to increase toward the commanded pressure after the clutch chamber has been filled. To alleviate the hydraulic priority selection of the still applied fourth speed ratio clutch 33 by the clutch priority valve 201, off-going clutch pressure is modulated below line pressure at time t0+ as shown in graph B from substantially line pressure (broken trace) to a predetermined hold pressure Ph (solid trace). This is seen to occur at a cut-in point much earlier during the fill period than is the case with a precise timed shift. Owing to less predictability during the sequenced shift, modulating earlier in the fill period ensures that premature fill and increased on-coming pressure associated therewith will not cause the undesirable blow-off of the fifth clutch. Once again, the hold pressure Ph is sufficient to maintain the torque capacity of the off-going clutch yet insufficient in conjunction with the on-coming pressure to shift the clutch priority valve 201 against the line pressure as previously describe. Therefore, the undesirable fifth clutch exhausting is prevented. The actual on-coming pressure (ONC) (lower solid trace forward of time t1 in graph A) is modulated below the line pressure (LP) to extend the torque transfer as mentioned and is seen to drop at the end of the fill period t1 to a predetermined initial value Pi in accordance with the commanded pressure. The illustrated step down in line pressure just after time t1 again merely marks a pressure matching duration in which the phasing of the PWM duty cycles of the fluid valve supplying the off-going clutch and the pressure regulator valve are matched. The torque phase of the shift is now entered at time t1 as the on-coming pressure increases and the off-going pressure decreases to thereby effectuate torque transfer from the fourth gear ratio to the fifth gear ratio as evidenced by the pulldown in turbine speed (graph C).

Figure 5:
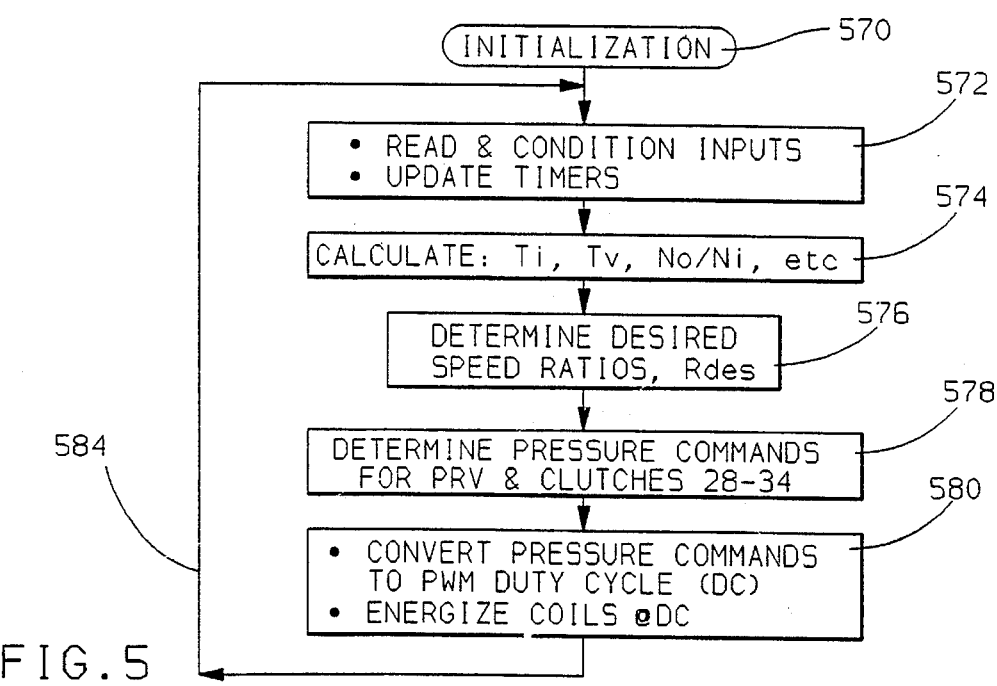
FIGS. 5–9 illustrate various flow charts representative of program steps executed by a controller in carrying out the control of the present invention.
Figure 2:
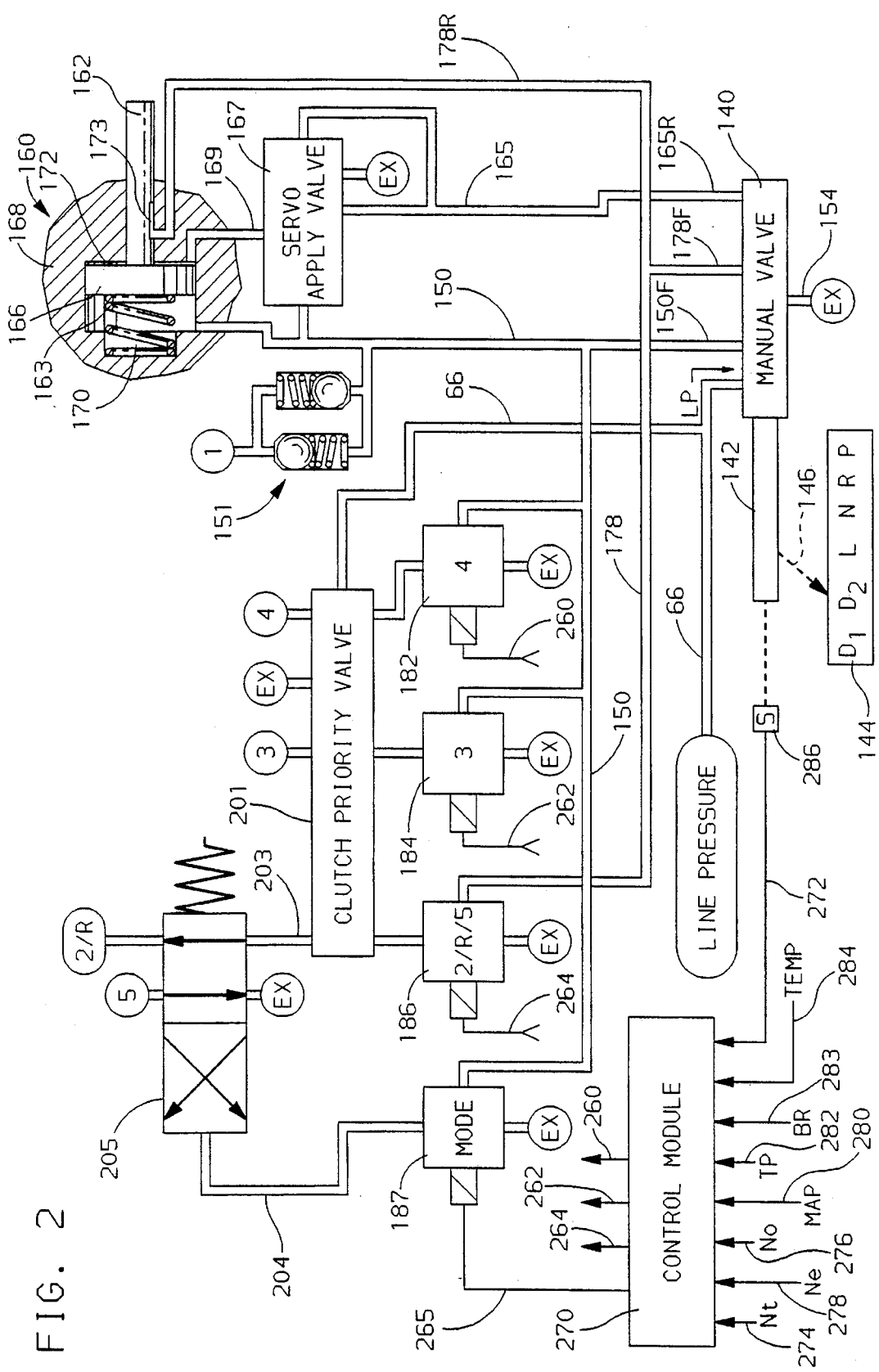

Turning now to FIGS. 5–9, a set of suitable program steps for execution by the controller in carrying out the control of the present invention are illustrated. Referring first to FIG. 5, the reference numeral 570 designates a set of program instructions executed at the initiation of each period of vehicle operation for initializing various tables, timers, etc., used in carrying out the control functions of this invention. Following such initialization, the instruction blocks 572–582 are repeatedly executed in sequence, as designated by the flow diagram lines connecting such instruction blocks and the return line 584. Instruction block 572 reads and conditions the various input signals applied to control module 270 via the lines 272–285, and updates the various control unit timers. Instruction block 574 calculates various terms used in the control algorithms, including the input torque Ti, the torque variable Tv (or gear set input torque), and the speed ratio No/Ni. Instruction block 576 determines the desired speed ratio, Rdes, in accordance with a number of inputs including throttle position, vehicle speed, and manual valve position.

In transmission control, this function is generally referred to as shift pattern generation. Instruction block 578 determines the clutching device pressure commands for effecting a ratio shift, if required. The pressure commands for the pressure regulator valve to establish line pressure and nonshifting clutching devices are also determined. An expanded description of the instruction block 578 is set forth below in reference to the flow diagrams of FIGS. 6–7. Instruction block 580 converts the clutching device and pressure regulator valve pressure commands to a PWM duty cycle based on the operating characteristics of the various actuators (empirically determined), and energizes the actuator coils accordingly.

Figure 6:
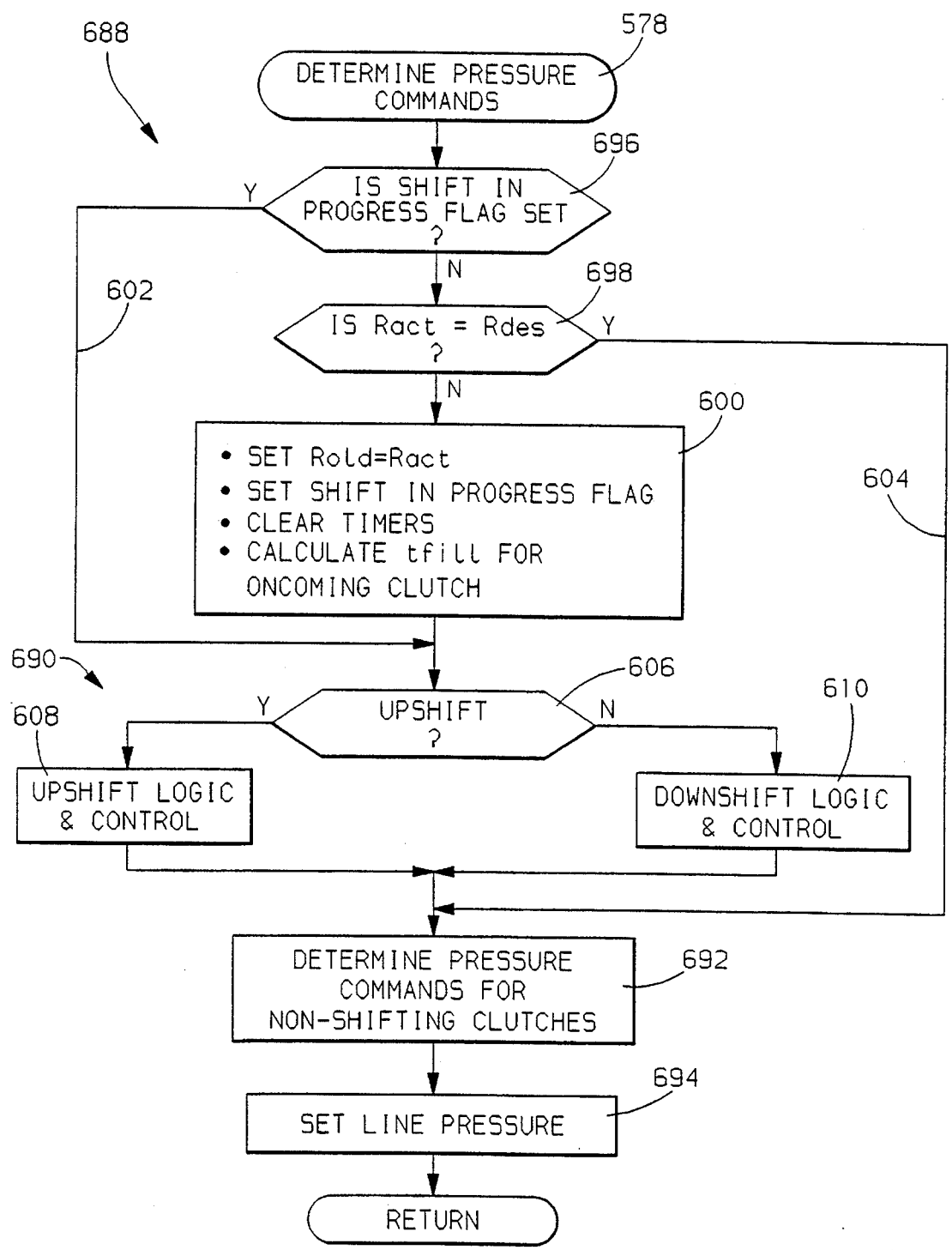
Figure 7:
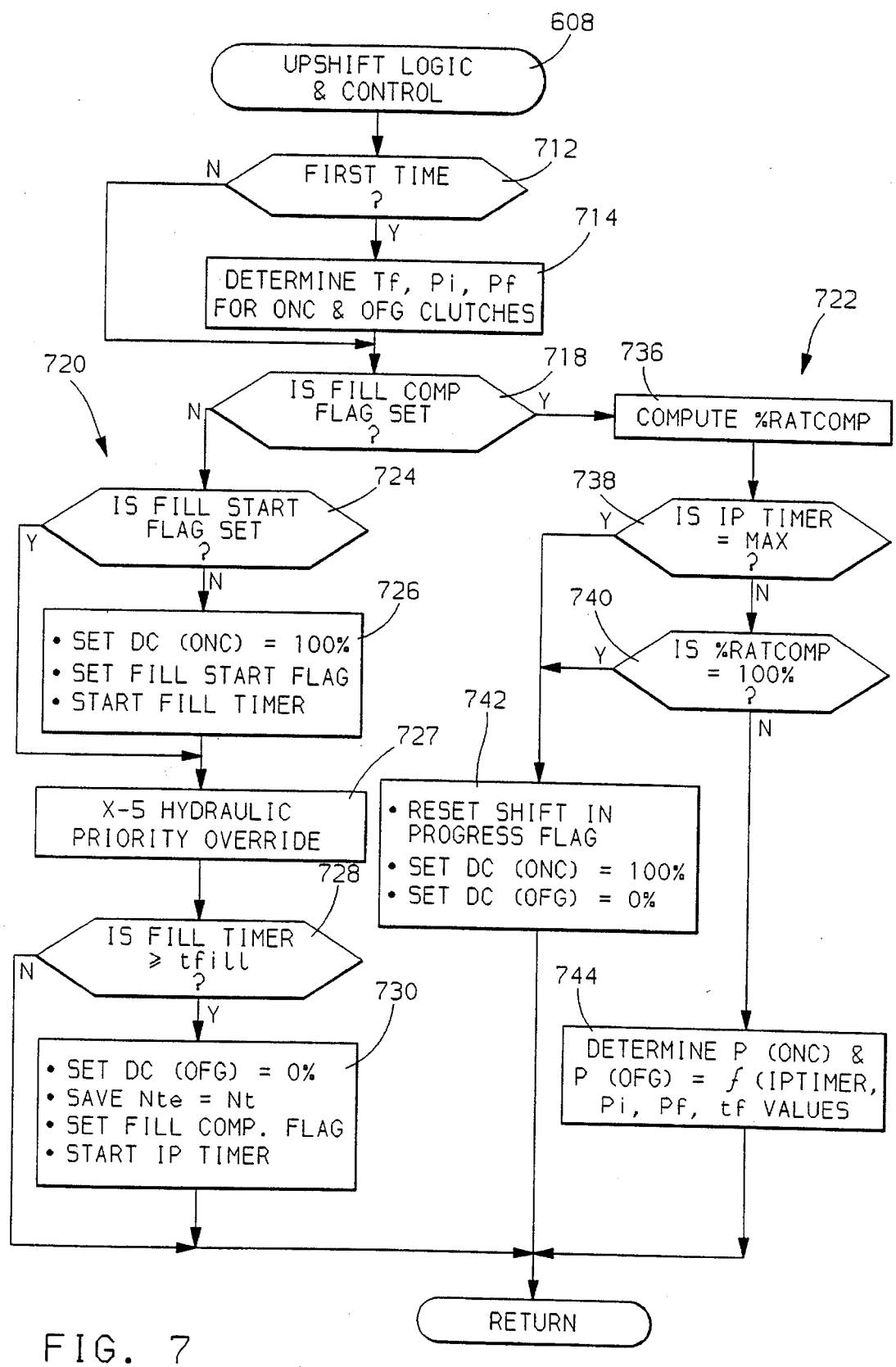

As indicated above, the flow diagrams of FIGS. 6–7 set forth the clutch and pressure regulator valve pressure determination algorithm generally referred to as the main loop instruction block 578 of FIG. 5. On entering such algorithm, the blocks designated generally by the reference numeral 688 are executed to set up initial conditions if a shift is desired. If a shift is desired, the blocks designated generally by the numeral 690 are executed to develop pressure commands for the clutching devices involved in the shift. Thereafter, the instruction blocks 692 and 694 are executed to develop pressure commands for the nonshifting clutches and the pressure regulator valve for controlling line pressure, completing the routine. An expanded description of the instruction block 694 is set forth below in reference to the flow diagram of FIG. 9.

The blocks designated by the numeral 688 include the decision block 696 for determining if a shift is in progress as indicated by the "SHIFT IN PROGRESS" flag; the decision block 698 for determining if the actual speed ratio Ract (that is No/Nt) is equal to the desired speed ratio Rdes determined at instruction block 576 of FIG. 5; and the instruction block 600 for setting up the initial conditions for a ratio shift. The instruction block 600 is only executed when decision blocks 696 and 698 are both answered in the negative. In such case, instruction block 600 serves to set the old ratio variable, Rold, equal to Ract, to set the "SHIFT IN PROGRESS" flag, clear the shift timers, and to calculate the fill time trill for the on-coming clutching device. If a shift is in progress, the execution of blocks 696 and 698 is skipped as indicated by the flow diagram line 602. If no shift is in progress, and the actual ratio, Ract, is equals the desired ratio, Rdes, then the execution of the instruction block 600 and the blocks designated by the reference numeral 690 is skipped, as indicated by the flow diagram line 604.

The blocks designated by the reference numeral 690 include the decision block 606 for determining if the shift is an upshift or a downshift; the instruction block 608 for developing pressure commands for the active (shifting) clutching devices if the shift is an upshift; and the instruction block 610 for developing the pressure commands for the active clutching devices if the shift is a downshift. To illustrate how such pressure commands are developed, the steps involved in the development of a typical power-on upshift (i.e. instruction block 608) are set forth in the flow diagram FIG. 7.

On entering the flow diagram of FIG. 7, the control unit executes a shift initializing routine comprising the blocks 712–714. In the first execution of the routine in a given shift, determined by the decision block 712, the instruction block 714 is executed to determine the pressure parameters Pi, Pf and tf for the on-coming (ONC) and off-going (OFG) clutching devices where Pi and Pf are initial and final pressures for the clutching device and tf is the duration of the torque and inertia phases. These quantities are calculated in accordance with the torque variable as detailed, for example, in U.S. Pat. No. 5,129,286 to Nitz et al., also assigned to the assignee of the present invention. In subsequent executions of the routine, decision block 712 is answered in the negative. Various other techniques may be employed for determining initial and final pressure quantities as well as shift duration quantities as known to transmission control artisans.

Decision block 718 is then executed to determine if the fill phase of the shift is completed, as indicated by the "FILL COMP" flag. If not, the flow diagram branch, generally designated by the reference numeral 720, is executed; if so, the flow diagram branch, generally designated by the reference numeral 722, is executed.

The flow diagram branch 720 includes a fill initializing routine comprising the blocks 724 and 726, an X-5 hydraulic priority override 727, and a fill completion routine comprising the blocks 728 and 730. At the beginning of each shift, the "FILL COMP" flag is not set and the decision block 724 of the fill initializing routine is executed to determine if the fill phase has started, as indicated by the "FILL START" flag. Initially, the "FILL START" flag is not set, and instruction block 726 is executed to set the energization duty cycle of the on-coming clutching device, DC(ONC), equal to 100%, to set the "FILL START" flag, and to start a FILL TIMER. Thereafter, decision block 724 is answered in the affirmative, and execution of instruction block 726 is skipped.

Block 727 is executed during each pass to establish at a predetermined point within the fill phase an override of the hydraulic priority in a X-5 upshift to prevent an undesirable neutral condition and attendant engine and turbine speed flare. An expanded description of the instruction block 727 is set forth below in reference to the flow diagram of FIG. 8.

Decision block 728 of the fill completion routine determines if the count in FILL TIMER is greater than or equal to the fill time trill determined at instruction block 600 of FIG. 6. If so, instruction block 730 is executed to save the entry turbine speed Nte, to set the "FILL COMP" flag, and to start the inertia phase timer, IP TIMER. If the decision block 728 is answered in the negative, the fill phase is incomplete and execution of the instruction block 730 is skipped.

After the fill period has elapsed and decision block 718 is answered in the affirmative, the flow diagram branch 722 is executed to complete the shift. First, the instruction block 736 is executed to calculate the value of the term %RATCOMP for use in pressure scheduling upon completion of the shift. The decision block 738 and 740 are then executed to determine if the count in IP TIMER is at a maximum value MAX, or if the term %RATCOMP is substantially equal to 100%. If either of the decision blocks 738 or 740 are answered in the affirmative, the shift is complete and the instruction block 742 is executed to reset the "SHIFT IN PROGRESS" flag, to set the on-coming duty cycle, DC(ONC), to 100%, and to set the off-going duty cycle, DC(OFG), to 0%. If both decision blocks 738 and 740 are answered in the negative, the instruction block 744 is executed to determine the base on-coming and off-going pressure commands, P(ONC) and P(OFG) as a function of the Pi, Pf, tf, and IP TIMER values.

Figure 8:
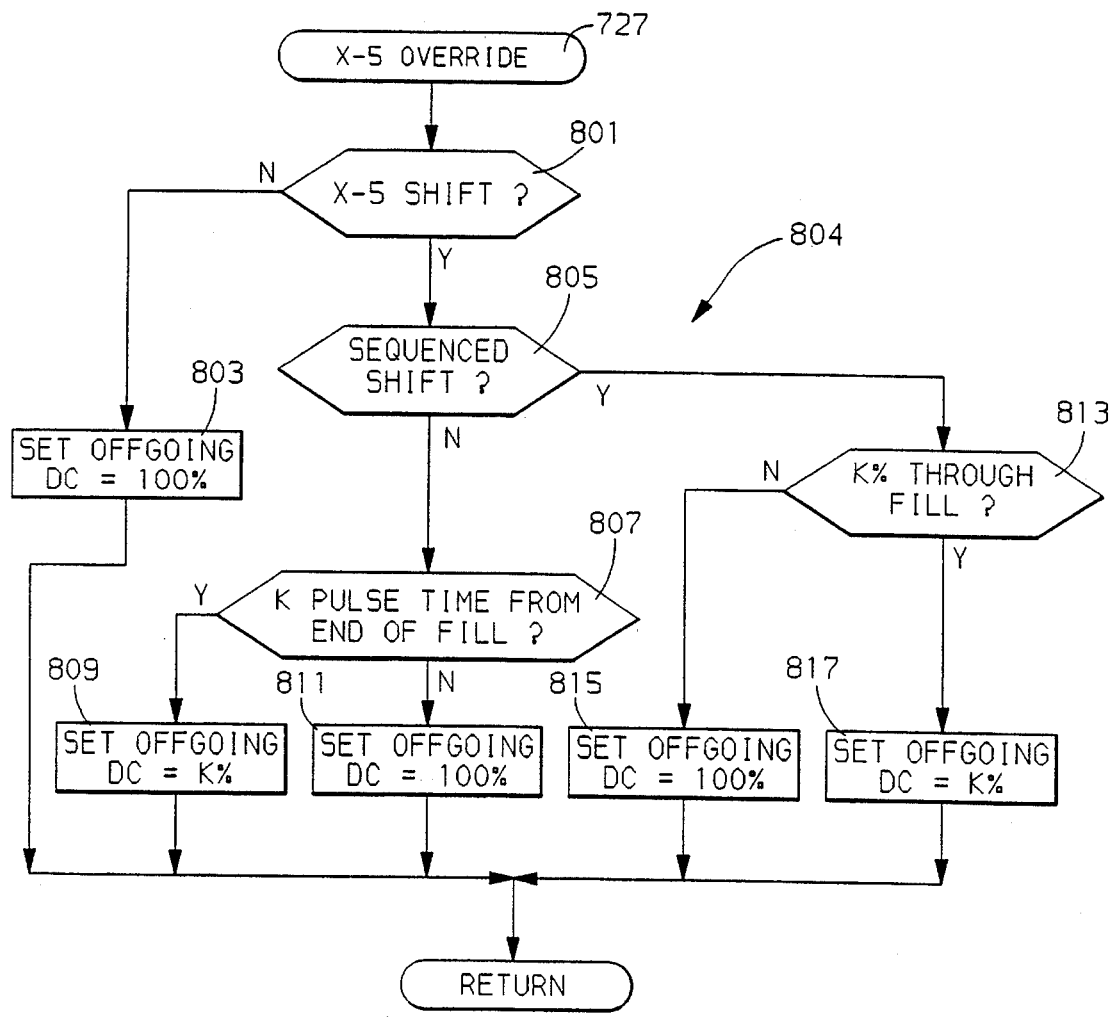

Turning now to the flow chart of FIG. 8, a determination is first made at decision block 801 whether the current shift is a valid X-5 upshift. That is to say, for the present embodiment, an upshift to the fifth gear ratio from either on of the third or fourth gear ratios. If the answer is negative, block 803 sets the off-going duty cycle DC(OFG) to 100%. This of course will remain at 100% throughout the fill period of the current X-5 upshift. If, however, the answer to block 801 is affirmative, the steps generally designated by the numeral 804 are executed beginning with decision block 805.

Decision block 805 determines whether the current X-5 upshift is a sequenced shift as described earlier. Assuming that block 805 is answered in the negative, steps 807–811 are executed. Decision block 807 first determines if it is an appropriate time within the fill phase to execute a reduction of fluid pressure to the off-going (fifth) clutch device. When the time remaining in the fill phase is less than or equal to a predetermined amount of time, in this example as measured by the PWM pulse periods remaining in the fill phase, a reduction in the fluid pressure is effected. In the immediate example, if the control is within a predetermined PWM pulses (K) from the end of the scheduled fill phases, then decision block is answered affirmatively and block 809 sets the off-going duty cycle DC(OFG) to a predetermined percentage (K%). K% is a duty cycle which is less than 100% yet sufficient to hold torque capacity of the off-going clutch without slipping. If the fill phase has not yet progressed to within K pulses from the end thereof, decision block 807 is answered negatively and block 811 retains the current duty cycle of the off-going clutch at 100%. It is preferred that the timing of the off-going pressure reduction is made with respect to the end of the fill phase since by doing so the overall shift timing is retained and the shift objective of a short duration is retained.

With block 805 answered positively, thereby indicating that a sequenced shift is underway, blocks 813–817 are executed. The sequenced shift situation is herein described for exemplification of an alternative mode of implementing a reduction in off-going clutch pressure as well as for reasons of completeness of description. At decision block 813, it is determined if it is an appropriate time within the fill phase to execute a reduction of fluid pressure to the off-going (fifth) clutch device. In a sequenced shift wherein shift timing is extended, a passage of a predetermined percentage of the total fill phase triggers a reduction in the off-going clutch pressure. Unlike a precise timed shift, the various factors in a sequenced shift contributing to the inherently more imprecise shift timing and extended fill phase timing make it desirable to implement the timing of the off-going pressure reduction at a point corresponding to a percent completion of the fill phase with adequate tolerance to prevent the priority valve from exhausting the on-coming clutch in the event of an early clutch chamber fill and capacity. An affirmative response at decision block 813 causes execution of step 817 whereat the off-going duty cycle is set to the predetermined percentage K%. Alternatively at decision block 813, a negative response results in block 815 setting the duty cycle to 100% thereby retaining the full line pressure at the off-going clutch until it is appropriate to make a reduction in accordance with fill progression beyond K%. Again, K% is a duty cycle which is less than 100% yet sufficient to hold torque capacity of the off-going clutch without slipping. In both a sequenced and non-sequenced shift, the reduced pressure seen at the off-going clutch is shown as the hold pressure value Ph in FIG. 4B and 11B.

Figure 9:
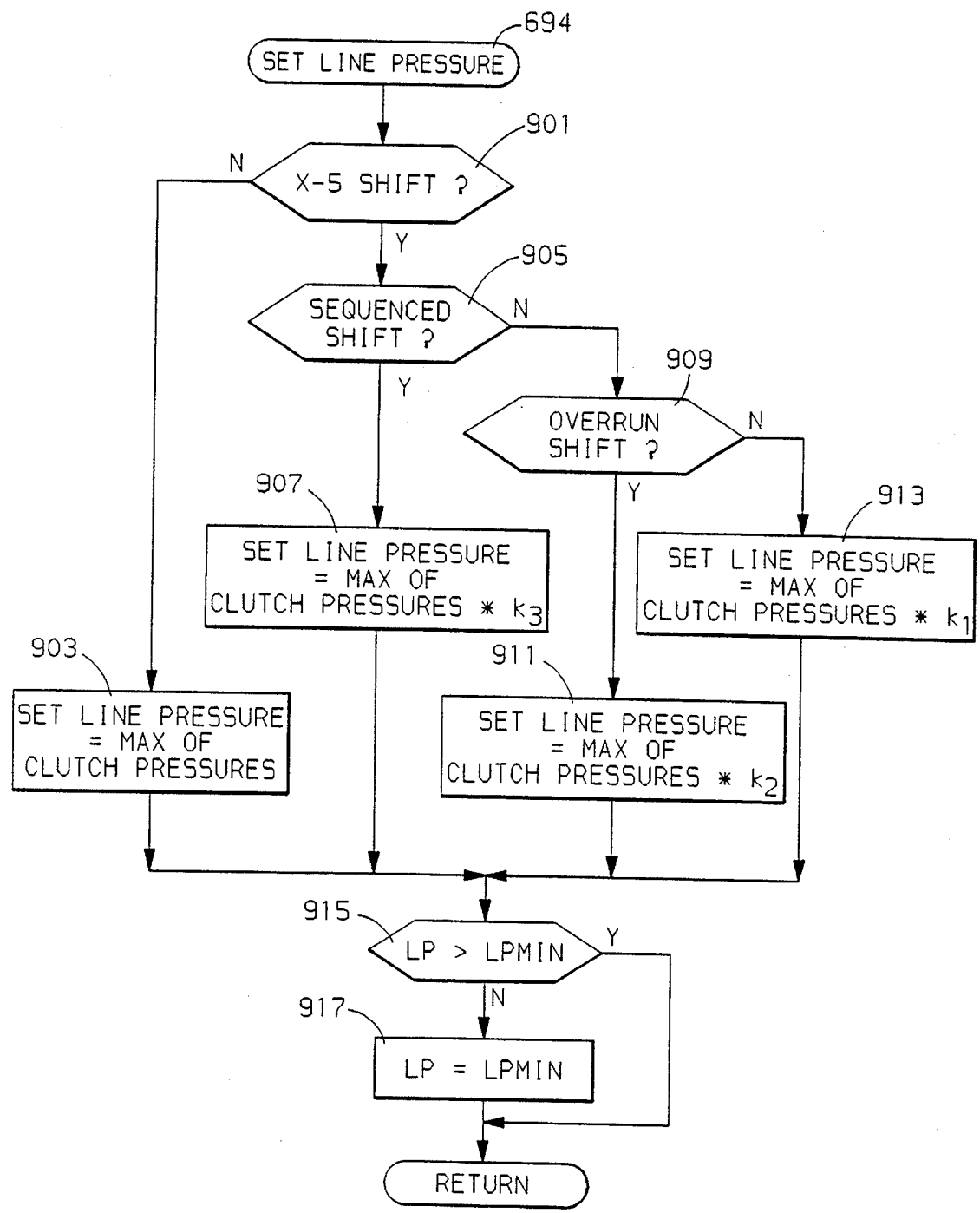

With respect to FIG. 9, a routine is illustrated for setting the line pressure in accordance with the type of shift being performed. Entry at block 694 corresponds to the same number block in the flow chart of FIG. 6. Decision block 901 first determines if the shift is an X-5 upshift. If the upshift is not an X-5 shift, then block 903 sets the line pressure to the maximum of clutch pressures as is conventionally practiced such that adequate pressure is available from line pressure. If, however, the shift is an X-5 upshift, then certain of the steps 905–913 are executed in accordance with various other shift conditions. For example, the line pressure will be set to different levels in accordance with whether the shift is a sequenced shift (block 907), a low torque precise timed shift (block 911), or a normal torque precise timed shift (block 913). In all such cases, the line pressure is set to the desired maximum of clutch pressures gained by a positive, greater than unity calibration (Ki). These gains effectively desensitize the clutch priority valve to the on-coming clutch pressure in as much the line pressure biases the valve against the on-coming clutch pressure contribution. Back to decision block 905, it can be seen that a sequenced shift results in a first X-5 line pressure arrived at with a first gain K3. If a sequenced shift is not indicated, block 909 determines if the upshift is an overran shift. An overrun shift is essentially a shift completed with low input torque due to the operator stepping out of the throttle after the control has committed to the shift. An overrun shift results in execution of block 911 and a second X-5 line pressure arrived at with a second gain K2. Finally, if block 909 determines that the upshift is not an overrun shift, then block 913 establishes a third X-5 line pressure with a third gain K1.

All line pressure establishing blocks (903,907,911 and 913) pass control to blocks 915 and 917 which ensure that line pressure is never below a minimum line pressure value. Control then returns to the main loop for conversion of the pressure commands for all clutches to appropriate duty cycles, which are in turn output to the respective solenoid pressure control valves.

While the invention has been disclosed with respect to certain preferred embodiments, it is to be understood that such embodiments are offered herein by way of exposition and not of limitation.

We claim:

1. A method of overriding a hydraulic priority during a clutch-to-clutch shift in an automatic transmission having a first speed ratio controllably engaged by a first fluid operated friction device and a second speed ratio controllably engaged by a second fluid operated friction device, said first and second speed ratios having interposed therebetween a third speed ratio controllably engaged by a third fluid operated friction device, a controllable line pressure, a first solenoid fluid valve for supplying a first fluid pressure from said line pressure to one of the first and second fluid operated friction devices via a controllable multiplex valve, a second fluid valve for supplying a second fluid pressure from said line pressure to the third fluid operated friction device, a clutch priority valve hydraulically interposed between the first fluid valve and the multiplex valve responsive to a net fluid pressure comprising first and second fluid pressures effective to disengage the one of the fluid operated friction devices supplied by the first fluid pressure, the method comprising:

during a fill phase of one of the first and second fluid operated friction devices wherein said first and second solenoid fluid valves are simultaneously supplying fluid pressure to respective fluid operated friction devices, reducing the second fluid pressure to a value that maintains engagement of the third clutch and that ensures the net fluid pressure does not cause the clutch priority valve to disengage the one of the fluid operated friction devices supplied by the first fluid pressure.

2. A method of overriding a hydraulic priority during a clutch-to-clutch shift as claimed in claim 1 wherein said clutch priority valve is further responsive to line pressure and said net fluid pressure opposes line pressure in the clutch priority valve, the method further comprising:

increasing the line pressure to thereby desensitize the clutch priority valve to the simultaneous supply of the first and second fluid pressures.

3. A method of overriding a hydraulic priority during a clutch-to-clutch shift as claimed in claim 1 wherein said second fluid pressure is reduced at a predetermined fixed time from completion of said fill phase.

4. A method of overriding a hydraulic priority during a clutch-to-clutch shift as claimed in claim 1 wherein said second fluid pressure is reduced at a predetermined ratio of completion of said fill phase.

5. A method of overriding a hydraulic priority during a clutch-to-clutch shift as claimed in claim 1 wherein one of said first and second speed ratios is coupled to an output in one of a forward and reverse directions, the method further comprising:

establishing an hydraulic default position for said controllable multiplex valve to supply the one of said first and second fluid operated friction devices corresponding to the one of said first and second speed ratios coupled to the output in one of the forward and reverse directions, whereby a loss of control of the multiplex valve does not result in loss of ability of the transmission output to operate in a reverse direction.

* * * * *